(No Model.) 5 Sheets—Sheet 1.
G. E. NORRIS.
MACHINE FOR MAKING MATCH SPLINTS.
No. 436,991. Patented Sept. 23, 1890.
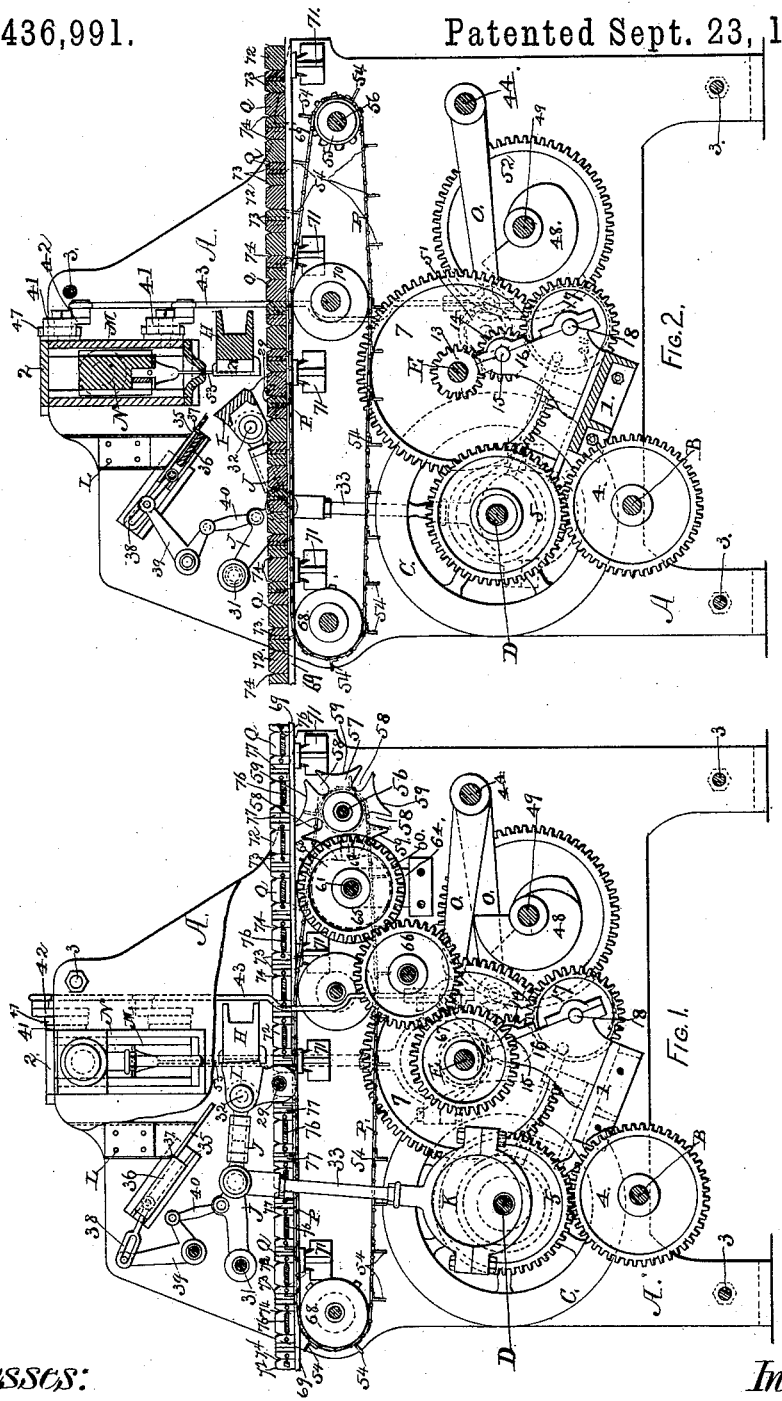
Witnesses:
S. B. Brewer
H. V. Scattergood
Inventor:
George E. Norris,
by William H. Low,
Attorney.

(No Model.)  5 Sheets—Sheet 2.

G. E. NORRIS.
MACHINE FOR MAKING MATCH SPLINTS.

No. 436,991.  Patented Sept. 23, 1890.

Witnesses:
S. B. Brown
H. V. Scattergood

Inventor:
George E. Norris,
by William H. Low.
Attorney.

(No Model.) 5 Sheets—Sheet 3.

G. E. NORRIS.
MACHINE FOR MAKING MATCH SPLINTS.

No. 436,991. Patented Sept. 23, 1890.

Witnesses:
S. B. Brewer
H. V. Scattergood.

Inventor:
George E. Norris,
by William H. ___
Attorney.

(No Model.) 5 Sheets—Sheet 4.

G. E. NORRIS.
MACHINE FOR MAKING MATCH SPLINTS.

No. 436,991. Patented Sept. 23, 1890.

Witnesses:
S. B. Brewer
H. V. Scattergood.

Inventor:
GEORGE E. NORRIS,
by William N. Low,
Attorney.

(No Model.) 5 Sheets—Sheet 5.
G. E. NORRIS.
MACHINE FOR MAKING MATCH SPLINTS.
No. 436,991. Patented Sept. 23, 1890.
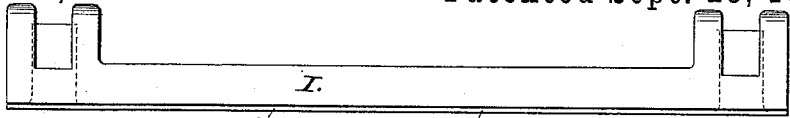
Fig. 13.
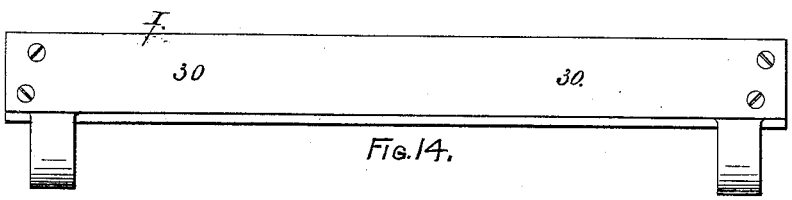
Fig. 14.
Fig. 16.
Fig. 15.
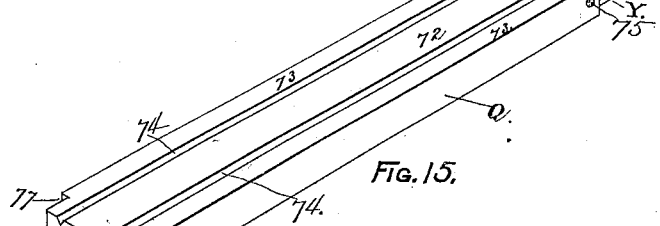
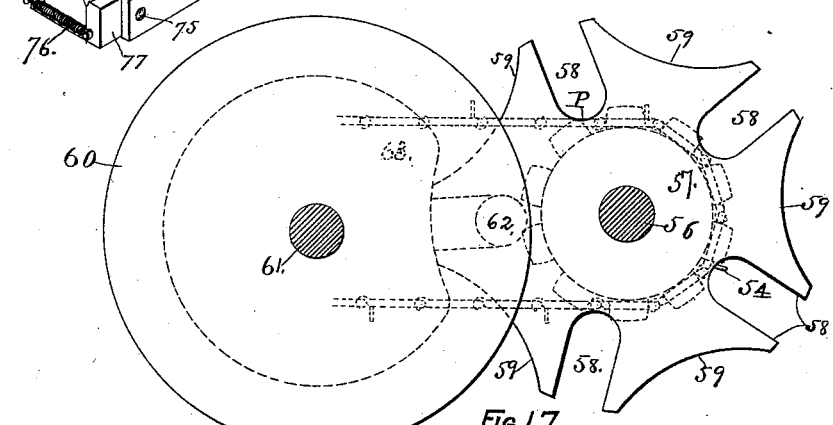
Fig. 17.
Witnesses:
S. B. Brewer
H. V. Scattergood
Inventor:
GEORGE E NORRIS,
by William K. Low,
Attorney.

UNITED STATES PATENT OFFICE.

GEORGE E. NORRIS, OF TROY, ASSIGNOR OF ONE-HALF TO ALONZO P. ADAMS, OF ALBANY, NEW YORK.

MACHINE FOR MAKING MATCH-SPLINTS.

SPECIFICATION forming part of Letters Patent No. 436,991, dated September 23, 1890.

Application filed May 22, 1889. Serial No. 311,704. (No model.)

*To all whom it may concern:*

Be it known that I, GEORGE E. NORRIS, of Troy, in the county of Rensselaer and State of New York, have invented new and useful Improvements in Machines for Making Match-Splints, of which the following is a specification.

This invention relates to improvements in machines for cutting match-splints from veneers which have been previously cut to a determined size; and it consists of the novel combination of parts, hereinafter described, for cutting the splints from veneers, and for automatically inserting said splints into clamps or other suitable devices for holding them while being dipped into an igniferous compound.

Figure 4:
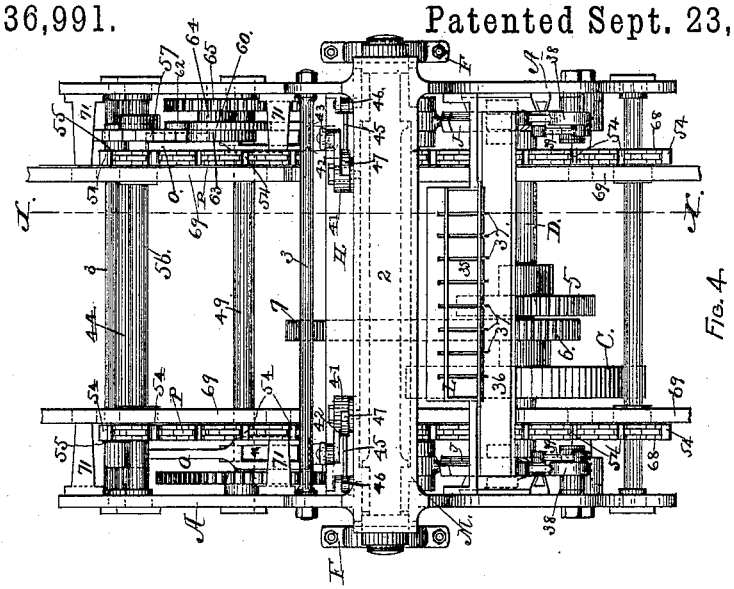
Figure 3:
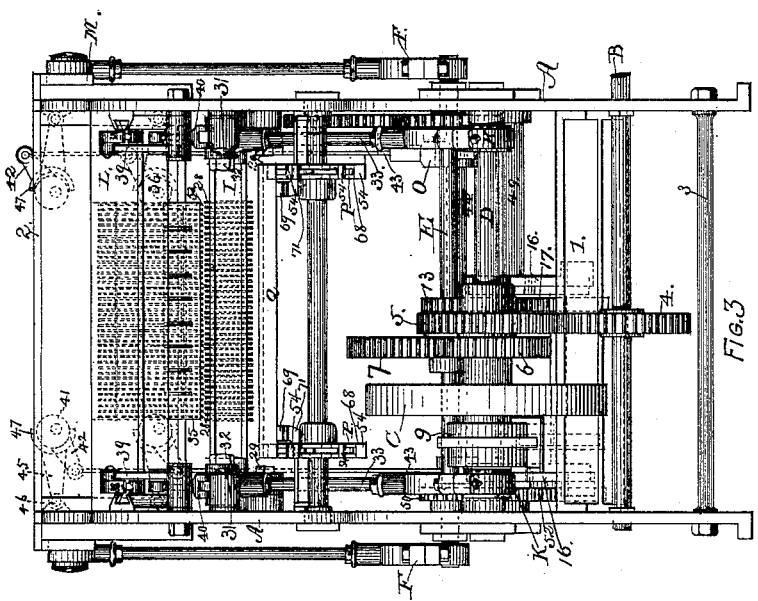
Figure 5:
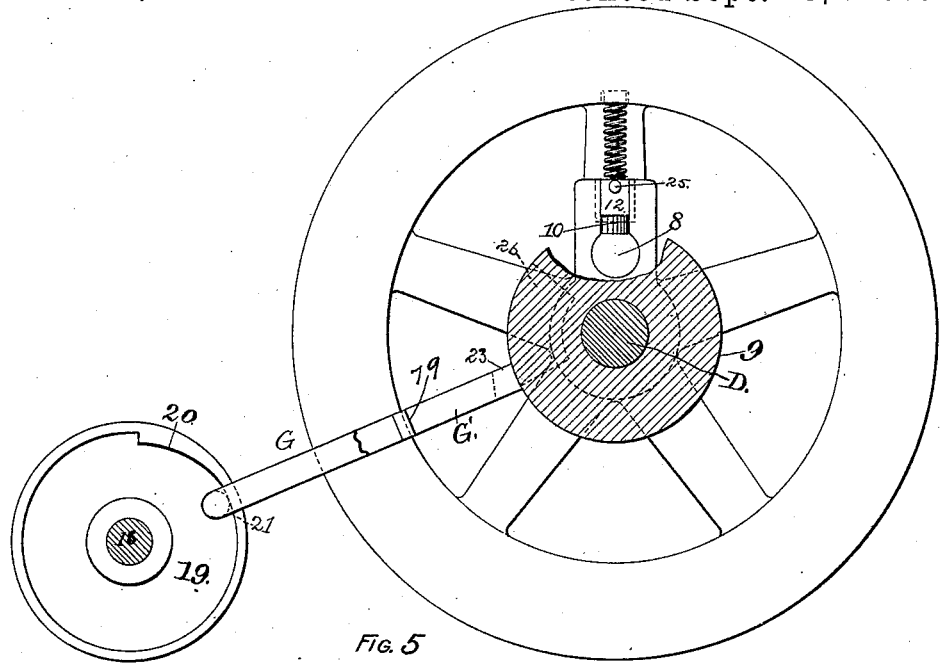
Figure 11:
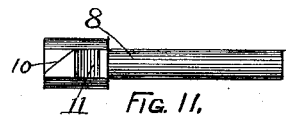
Figure 7:
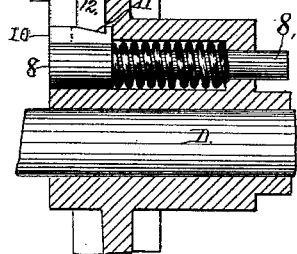

In the accompanying drawings, which are herein referred to and form part of this specification, Figure 1 is a side elevation of my match-splint machine with part of the nearest side frame broken away to show underlying parts. Fig. 2 is a longitudinal section of the machine at the line X X on Fig. 4. Fig. 3 is a front elevation. Fig. 4 is a plan view. Figs. 5, 6, 7, 8, 9, 10, 11, and 12 are details, on an enlarged scale, of the automatic clutch for engaging the cutter-operating mechanism with the driving-shaft. Figs. 13 and 14 are respectively an enlarged plan view and an enlarged front elevation of the movable jaw of the cutting mechanism. Fig. 15 is an enlarged perspective view of one of the clamping devices for receiving the splints from the cutting mechanism. Fig. 16 is a transverse section of the same at the line Y Y, and Fig. 17 is a side elevation of the stop-wheel for the mechanism for feeding along the clamp devices.

As represented in the drawings, A designates the frame of the machine, which is preferably made of metal, either in the form shown or in any other form that is suitable for the purpose. The side frames of said frame are held together by a cross-piece 1, a top plate 2, and bolts 3; but the number of the latter and their positions may be varied to suit the requirements of the machine.

B is the driving-shaft, to which a rotatory motion can be imparted by any suitable motive power. Said shaft has a gear-wheel 4, secured thereto, and said wheel gears into a like wheel 5, which is fastened to the hub of a balance-wheel C, which is loosely fitted upon an intermittently-rotating shaft D, so that said balance-wheel and the parts secured thereto will make the same number of revolutions in a given time as are imparted to the gear-wheel 4. A smaller gear-wheel 6 is also secured to the hub of the balance-wheel C, and has an equal number of revolutions therewith. The gear-wheel 6 gears into a larger gear-wheel 7, which is secured to a shaft E, which has an eccentric F at each end of it, for a purpose hereinafter explained. The shaft E, by reason of the intervention of the wheels 6 and 7, has a lower rate of speed than the shaft D during the time the latter is in motion.

The hub of the balance-wheel C is provided with a spring-actuated bolt 8, which is fitted to engage in a collar 9, secured to the shaft D, so as to lock said balance-wheel to the shaft D when it is necessary to impart a rotatory motion to said shaft. The bolt 8 is provided with a spline, whose outer end has an angle-face 10, and just behind said angle-face a notch 11 is formed in said spline to receive the end of a spring-actuated locking-latch 12, which when the bolt 8 is pushed inward will engage in said notch and retain said bolt in its retracted position. The outer end of the bolt 8, when the latter is in its retracted position, is flush with the outer face of the hub of the balance-wheel C, and until the bolt 8 is released, as hereinafter described, said balance-wheel is free to rotate without affecting the collar 9, and through said collar the shaft D.

On the shaft E is secured a pinion 13, which engages in a pinion 14, which is secured to a short shaft 15, which is journaled in the bracket-bearings 16, and the pinion 14 engages in a pinion 17, secured to a short shaft 18, which is also journaled in the bracket-bearings 16. The speed of the shaft E being less than that of the shaft D while the latter is in motion and the pinion 13 being smaller than the pinion 17, a second reduction in speed is effected between the shafts D and 18, and the latter will revolve slower than the shaft E. This differential rate of speed is required to effect a cessation of motion of the shaft D, so as to enable a swinging jaw, hereinafter referred to, to remain at rest while the ejectors are forcing the several splints from the cutting mechanism.

The shaft 18 has secured to it a cam-disk 19, which has on the inner side of its rim a cam-face 20, (shown in Figs. 5 and 6,) said cam-face being adapted to engage with a stud 21 on a sliding bolt G, so as to draw the latter toward the shaft 18 against the resistance of a spring 80, that exerts its pressure to force said sliding bolt toward the shaft D. The outer end of the sliding bolt G is fitted to engage in a notch in the collar 9, as indicated by dotted lines in Fig. 8, when said sliding bolt is at the outer extremity of its movement, and thereby the shaft D and the parts attached to it are locked in an immovable condition. Said sliding bolt is provided with a lug 78, that is adapted to engage with a corresponding lug 79, that is formed on a sliding cam-piece G', which is parallel to the sliding bolt G, and is arranged to operate the mechanism that locks the balance-wheel C to the collar 9, said cam-piece being connected to a spring 22, whose tension pushes the cam-piece toward the shaft D.

Figure 6:
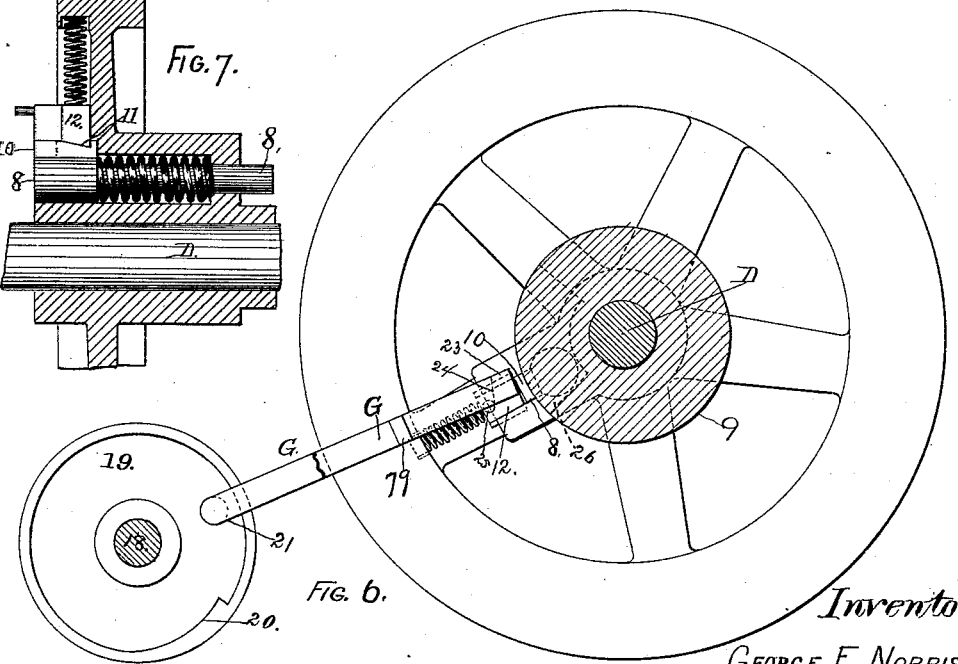
Figure 8:
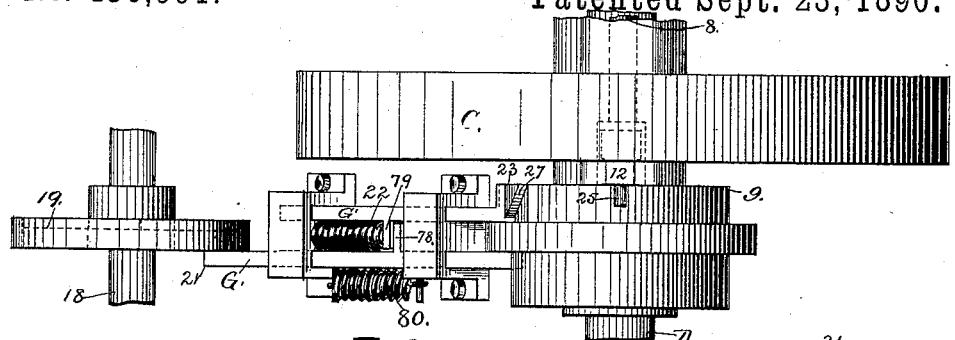
Figure 12:
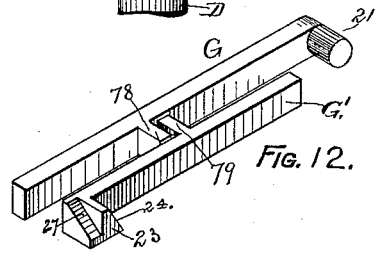
Figure 9:
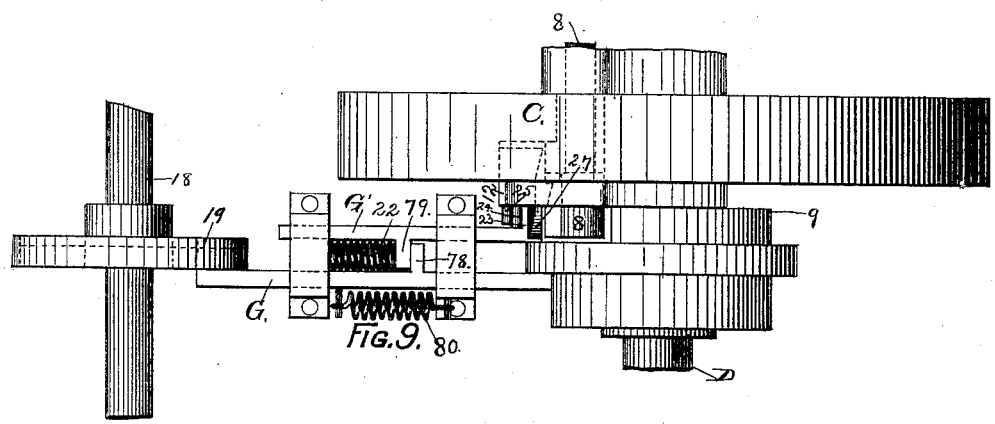
Figure 10:
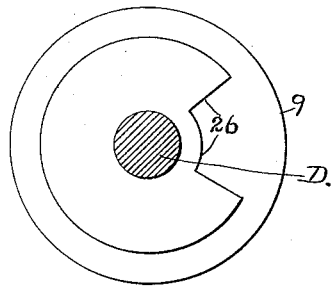

The outer end of the cam-piece G' is provided with a head 23, whose rearmost side is beveled, as at 24, for the purpose of engaging with a pin 25 on the latch 12, when by the rotation of the balance-wheel C and drawing in of the sliding bolt G the parts are in the positions shown in Fig. 6. Thereby the locking-latch 12 is drawn out of the notch 11 and the bolt 8 is permitted to shoot outwardly to enter the notch 26 in the collar 9 to lock the balance-wheel C to the shaft D, so that said wheel and shaft will move as one piece. The outer face of the head 23 is beveled, as at 27, for the purpose of engaging with the angle-face 10 on the spring-bolt 8 when the balance-wheel C reaches the proper point for so doing, and while said bolt is projected outward beyond the face of the hub of said wheel, and thereby said bolt is forced inwardly to disengage the collar 9 from said balance-wheel, so as to leave the latter free to revolve without affecting the shaft D, which will remain quiescent until the collar 9 and balance-wheel C are again automatically locked together in the manner hereinabove described.

H is a cross-beam or cutter-head, which is provided with a series of vertically-arranged cutters 28, which are spaced apart at distances which are equal to the required diameter of the match-splints. Directly in front of said cutter-head is a swinging jaw I, that is hung on pivots 29, so that it can be forced toward the cutter-head H in order to effect the separation of the veneers into splints. Said jaw is provided with a face-piece 30, of rawhide or other suitable material, into which the cutting-edges of the cutters can penetrate to a slight distance in affecting a perfect separation of the veneers into match-splints, and thereby the separated splints are compressed between the cutters 28.

Toggle-joints J, which have one end pivoted to fixed studs 31, secured to the side frames of the machine and their opposite end jointed, as at 32, to the jaw I are connected by rods 33 to the eccentrics K, which are secured to the intermittently-rotating shaft D for the purpose of imparting the proper motions to the jaw I at the required times. Said toggle-joints are fitted to move slightly above a direct line, so that the jaw I, after it has been moved to effect the cutting of the veneer into splints, will be drawn back slightly to relieve said splints, which would otherwise be clamped between the jaw I and the cutter-head H, and it should be understood that said toggle-joints are retained in the last-described position during the time that the shaft D remains in a quiescent condition.

L is a receiver for containing the veneers or blanks from which the match-splints are cut. Said receiver is provided with a slotted bottom 35, that is fixed in an inclined position, so that its lower edge will be nearest the cutting mechanism. The side of said receiver that is nearest the cutting mechanism is provided with a slotted opening, which runs lengthwise of the receiver and of which the bottom 35 forms the lower boundary. Through said slotted opening the pieces of veneers are ejected—a single one at a time—to enter the cutting mechanism.

A feeder 36, which is provided with spurs 37, that project through the slots in the bottom 35, is fitted to slide directly under the bottom plate of the receiver L, for the purpose of ejecting the veneers, a single veneer at a time, from said receiver into the cutting mechanism. To impart the required movements to said feeder, slotted links 38 are pivoted thereto, and the slotted end of each of said links receives the wrist-pin of a bell-crank 39, so that said wrist-pin may have a free movement in the slot of the links at the end of each phase of the vibratory motion of said bell-cranks without effecting a movement of the feeder 36, or, in other words, the end of the bell-cranks to which said links have a connection has a greater extent of movement than is required to be imparted to the feeder, and the slots of the links permit the wrist-pins of the bell-cranks to have a lost motion therein. The short arm of said bell-cranks is connected by a link 40 to the adjacent member of the corresponding toggle-joint, so that the latter and the bell-cranks will move simultaneously, and so that the ejecting movement of the feeder 36 will be made while the jaw I is drawn back, as shown in Fig. 2, thereby allowing the veneers to have an unobstructed passage from the receiver to the cutting mechanism.

M is a guide-box, that is fitted to have a slight endwise movement equal to the diameter of a match-splint in the upper part of the side frames of the machine, and in said guide-box a cross-head N is fitted to reciprocate vertically. Said cross-head, by being guided in its reciprocating movements by said guide-box, partakes of the endwise movements of the latter. The cross-head N receives its vertical motions from the eccentrics F on the shaft E, which is constantly rotating.

The guide-box M has pivoted thereto a series of eccentrics 41, which are arranged in pairs and so that the throw or larger part of the pair at one end of said guide-box will stand in an opposite direction to the throw of the pair at the opposite end of said box. Each of said eccentrics is provided with a radial arm 42, from which a connection is made by rods 43 to the free end of the levers O, that are fitted to swing loosely on a stationary shaft 44, so that each of said levers may have an independent motion imparted to it without being affected by the motion of the other. Each eccentric 41 is fitted to engage in a single arm 45 of a series that is pivoted, as at 46, to the frame A, and each of said arms has at its free end a concave 47, which is fitted to the periphery of the eccentric on which it engages. The eccentrics 41 and arms 45 are adjusted in such manner that when one pair of said eccentrics is moved to have a full bearing in the concave ends of the corresponding arms 45, the other pair of said eccentrics will be in position to leave a clear space between them and the concave ends of the arms 45, which are appropriated to them, as shown by dotted lines in Fig. 3, and thereby a slight degree of lost motion is obtained when either pair of said eccentrics begin moving toward the concave ends of the corresponding arms 45.

The levers O are raised alternately by cams 48, which are secured to a shaft 49, that derives its motion from the shaft E, and for that purpose a pinion 50 is secured to the shaft E and is fitted to engage into a pinion 51, (indicated by dotted lines in Fig. 2,) which gears into a gear-wheel 52, that is secured to the shaft 49, and this train of gears should be so proportioned that the speed of the shaft 49 will be about one-fourth of the speed of the shaft E. It should be understood that the falling movements of the levers O will move the eccentrics 41 into position to effect the endwise movements of the guide-box M, and that by the rising movements of said levers the eccentrics connected thereto will be carried into positions where they will be clear from the concave ends of arms 45 that are appropriated to them.

To the cross-head N is secured a series of plungers or ejectors 53, which are fitted to enter the spaces between the cutters 28, so as to force the splints therefrom. Said ejectors are so spaced that they will at each descent of the cross-head N force out one half of the splints produced by one action of the cutting mechanism, the other half of said splints being ejected by the next descending movement of the cross-head N, the latter during the interval between the said two descending strokes having been shifted endwise, in the manner above described, to bring said ejectors into position to effect this purpose.

P are endless belts, preferably formed of chain-links and provided with lugs 54, which are adapted to engage with clamping devices which receive the match-splints as they are ejected from the cutting mechanism. Said belts have an intermittent motion imparted to them by sprocket-wheels 55, that are secured to a shaft 56, whereon is also secured a stop-motion wheel 57, the latter being provided with a series of radial slots 58 and intermediate concave depressions 59.

A disk 60 is secured to a shaft 61, and provided with a stud 62, that projects from the side of said disk and is fitted to engage successively in the slots of the stop-motion wheel 57, and thereby impart the required intermittent motion to the shaft 56. Said disk is also provided with a hub or projection 63 on the same side with the stud 60, and the periphery of said hub is divided into a convex portion and a concave portion, as indicated by dotted lines in Fig. 17, the convex portion being adapted to engage in the concave depressions of the stop-motion wheel 57, thereby preventing any rotation of the shaft 56 while such engagement continues, and the concave portion which lies centrally on a line drawn between the centers of the shaft 61 and stud 62 permits the long points of the stop-motion wheel to pass said hub when the stud 62 is imparting a partial rotation to said wheel, and consequently to the sprocket-wheels 55, to give an intermittent progressive movement to the endless belts T for the purpose of carrying the clamping devices when charged with splints to the required point of delivery, and it should be understood that the intervals of rest for said belts must be arranged to occur at such times that a clamping device will be in position under the cutting mechanism to receive a charge of splints from the latter.

The shaft 61 is journaled in one of the side pieces of the frame A and in a bracket 64, secured thereto. Said shaft is provided with a pinion 65, which gears into an idler-pinion 66, which in its turn gears into a pinion 67, secured to the shaft E, and by the latter motion is imparted through the train of gearing last described to the disk 60.

The opposite bend of endless belts P passes over carriers or sprocket-wheels 68, and the intermediate upper stretch of said belts is supported on a level with the guide-strips 69 by means of carriers 70, as shown in Fig. 2. Said guide-strips are preferably supported on the frame A by means of brackets 71, and the sprocket-wheels 55 are arranged to carry the corresponding bend of the endless belts sufficiently below the plane of said guide-strips to effect an automatic releasement of the lugs 54 from the clamping devices.

Q is the clamping device that is preferably used for receiving the splints as they are delivered from the cutting mechanism and for retaining said splints during the operation of dipping them into an igniferous compound. Each of said clamping devices consists of a central bar 72 and two side bars 73, all of which have their upper conjoining edges correspondingly chamfered, so that when said bars are joined together side by side a V-shaped groove 74 will be formed along the upper side of each joint. Dowel-pins 75 are inserted in each set of said bars in such manner that the latter will freely move thereon, and springs 76 are attached to each set of the bars to normally maintain the joints in a closed condition.

In the outer faces of the side bars 73 notches 77 are formed for the purpose of receiving therein the lugs 54 without disturbing the proper spacing of the clamping devices on the endless belts P.

The clamping devices herein shown and described are old and form no part of this invention.

This machine operates in the following manner: While the toggle-joints J are moving to carry the jaw I into an open position, as shown in Fig. 2, so as to admit a veneer to the cutting mechanism, they move the bell-cranks 39 to effect a feeding movement of the sliding plate 36, and thereby a piece of the veneer is carried from the bottom of the stock of veneers in the receiver L and deposited between the jaw I and cutter-head H. The jaw I is then moved by the toggle-joints J into the position shown in Fig. 1, and in effecting the latter movement the cutters 28 are forced through the piece of veneer to effect the separation of the latter into splints. Said splints are retained in the spaces between the cutters 28 for a sufficient time to permit the jaw I to be drawn slightly back by the movement of the toggle-joints J above a direct line, as hereinbefore described, and while the cross-head N is making two downward strokes. By the first descent of said cross-head a moiety of the splints is forced downward into a joint of the clamping device Q, then lying at rest beneath the cutting mechanism. Then while the cross-head N is approaching the termination of its upward stroke, the guide-box M is moved endwise in the manner hereinbefore described, and at the same time the endless belts P are moved by their operating mechanism to bring the next succeeding joint of the clamping device into position to receive a charge of the splints from the cutting mechanism. By the next descending stroke of the cross-head N the balance of the splints remaining between the cutters 28 are forced downward into the joint of the clamping device that is then in position to receive them, after which the cross-head N is again moved upwardly. When the last-described movement has been effected, the cam-disk 19 will be in position to effect a retractive movement of the sliding bolt G from the notch in the collar 9. In this retractive movement said sliding bolt and cam-piece G' move in unison, and the latter will be carried into position to release the spring-actuated bolt 8, and the latter, by engaging the collar 9, will couple the balance-wheel C to said collar to produce a single rotation of the shaft D, and while this single rotation of said shaft is being made the sliding bolt G remains disengaged from the notch in the collar 9, thereby leaving the shaft D free to make its single revolution, and by this rotation of said shaft the toggle-joints J will be moved to draw back the jaw I, feed in another veneer, and force said jaw against the cutters 28, and thereby separating the veneer into splints. After each single rotation of the shaft D, the spring-actuated bolt 8 will be automatically forced backward by the cam-piece G' to disengage the balance-wheel C from the collar 9, and thereby the shaft D is left to remain quiescent for an interval while the other parts of the machine are performing their several functions, and this operation can be continued in the same manner so long as the receiver L contains a supply of veneers.

What I claim as my invention, and desire to secure by Letters Patent, is—

1. In a machine for making match-splints, the combination of a cutting mechanism consisting of a stationary cutter-head and a movable jaw, a veneer-feeding mechanism, and a splint-ejecting mechanism fitted to eject the splints endwise from the cutting mechanism, as and for the purpose herein specified.

2. In a machine for making match-splints, the combination of a cutting mechanism consisting of a stationary cutter-head and a movable jaw, a veneer-feeding mechanism, and an ejector mechanism consisting of a vertically-reciprocating cross-head provided with a series of ejectors whose numbers equal a moiety of the splints produced at each cutting movement of the cutting mechanism, said ejectors being spaced to enter every other space between the cutters of the cutting mechanism, and said cross-head being fitted to receive an endwise movement between every other downward stroke thereof, as and for the purpose herein specified.

3. In a machine for making match-splints, the combination of a cutting mechanism consisting of a stationary cutter-head and a movable jaw, toggle-joints connected to said movable jaw for the purpose of imparting motion to the latter, and eccentrics connected to said toggle-joints and secured to an intermittently-rotating shaft, as and for the purpose herein specified.

4. In a machine for making match-splints, the combination of a cutting mechanism consisting of a stationary cutter-head and a movable jaw, the latter being operated by toggle-joints whose middle pivots have a movement during the operation of cutting the splints from a point which lies below a straight line drawn between the centers of their end pivots to a point which lies above said line, as and for the purpose herein specified.

5. In a machine for making match-splints, the combination of a cutting mechanism consisting of a stationary cutter-head and a movable jaw, the latter being fitted to move in the following manner: first, a full forward movement toward the stationary cutter-head for effecting the separation of the veneer into splints and the compression of said splints; next, a partial backward movement for the releasement of said splints from pressure, and, finally, a full backward movement for disposing of the cutting mechanism for the reception of the next veneer, as and for the purpose herein specified.

6. In a machine for making match-splints, an automatic clutch mechanism consisting of a constantly-rotating wheel or disk that is loosely fitted on an intermittently-rotating shaft and provided with a spring-actuated bolt and a retaining-latch for holding the latter, said shaft being provided with a collar in which said bolt occasionally engages, a sliding bolt that locks said shaft from rotating, and which is fitted to move a sliding cam-piece that effects the protrusion and intrusion of the spring-actuated bolt, and a cam-disk which is fitted to impart motion to said sliding bolt in one direction and which is secured to a shaft having a lower rate of speed than the driving-shaft, as and for the purpose herein specified.

GEORGE E. NORRIS.

Witnesses:
WM. H. LOW,
S. B. BREWER.